3,498,784
PHOTOCONDUCTIVE POLYMERS AND PLATE
David E. Kramm, Laurel, and James F. Light, Clarksville, Md., assignors to W. R. Grace & Co., New York, N.Y., a corporation of Connecticut
No Drawing. Filed Dec. 29, 1966, Ser. No. 605,630
Int. Cl. G03g 5/06
U.S. Cl. 96—1.5
10 Claims

ABSTRACT OF THE DISCLOSURE

A photoconductive plate comprising an electrically conductive sheet having a cover of a photoconductive organic polymer. The photoconductive organic polymer is prepared by making a prepolymer A by reacting a glycol with less than an equivalent amount of a difunctional organic acid. Prepolymer A is then reacted with an octa-carboxylated metal phthalocyanine to give a prepolymer B. The prepolymer B is reacted with a liquid vinyl compound in the presence of an organic peroxide to give the photoconductive organic polymer.

---

The present invention relates to a novel and useful photoconductive polymer. More particularly, it relates to an electrically conductive sheet having a cover of a photoconductive organic polymer.

It is known in the art that various materials such as selenium, cadium sulfides, and the like are photoconductive and these have received widespread acceptance in the fields of xerography and detecting devices of various sorts. However, such materials are quite expensive and rather difficult to apply to the electrically conductive sheet. Quite obviously, if a relatively inexpensive polymer could be prepared which would be photoconductive and easily attached to the conductive sheet, it would receive widespread acceptance in the art.

It is an object of the present invention to provide a photoconductive polymer in sheet form. A further object is to provide a photoconductive plate containing a coating of a photoconductive organic polymer. Another object is to provide a relatively inexpensive photoconductive plate. Other objects will become apparent as the description of the invention proceeds.

These objects are accomplished by the present invention which provides a photoconductive plate comprising an electrically conductive sheet having a cover of a photoconductive organic polymer.

The present invention also provides a photoconductive sheet comprising a sheet of a polymer formed by reacting an equivalent of a glycol of the formula $$R(OH)_2$$

wherein R is an organic radical with from about 0.50 to about 0.95 equivalent of difunctional organic acid in which from about 0.1 to about 0.95 of the equivalent are supplied by an acid selected from the group consisting of fumaric acid, maleic acid and maleic anhydride, at a temperature sufficient to eliminate some of the water formed in the reaction and give a prepolymer A having an acid number of from about 5 to about 100, reacting the prepolymer A with from about 0.05 to about 0.50 equivalent of a compound of the formula

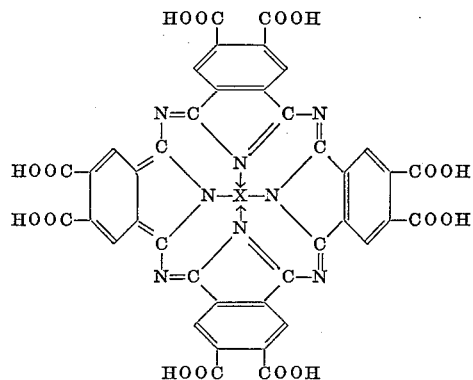

wherein X is a polyvalent metal at a temperature sufficient to substantially eliminate all of the water formed in the reaction and give a prepolymer B, cooling the resulting prepolymer B and thereafter reacting prepolymer B with from about 5% to about 100% by weight, based on the weight of prepolymer B, of a liquid vinyl compound of the formula $$CH_2=CH-Y$$

wherein Y is an organic radical having from 1 to about 15 carbon atoms in the presence of an organic peroxide. In the formula the arrows denote coordinate valences. In the reaction the term "equivalents" as used herein is intended to mean and is used interchangeably with the term "molar equivalents."

In a preferred embodiment of the present invention X is copper and the liquid vinyl compound is styrene.

In preparing the prepolymer A in accordance with the present invention, a glycol is reacted with less than an equivalent amount of a difunctional organic acid to give a prepolymer A which still contains active hydroxyl groups. At least a portion of acid employed in making prepolymer A must be fumaric acid, maleic acid and/or maleic anhydride to impart the desired characteristics to the prepolymer A. It should be noted that at the elevated temperature employed for the reaction there is some isomerization of the maleic acid so that it is equivalent to the fumaric acid. Other acids may be mixed with these acids to form prepolymer A. Such acids include adipic acid, succinic acid, phthalic acid, terephthalic acid, isophthalic acid, azelaic acid, sebacic acid, and many others. The glycols which may be employed in the prepartion of prepolymer A include, without limitation, 1,2-propylene glycol, 1,4-butane diol, diethylene glycol, ethylene glycol, 1,2-propylene glycol, 1,6-hexane diol, carbowax, diethylene glycol, dipropylene glycol, pentaerythritol, trimethylolpropane, trimethylolethane, bis-phenol A, 4-hydroxymethyl benzyl alcohol and other such materials.

The prepolymer B is then formed by reacting the octacarboxylated metal phthalocyanine with prepolymer A. Since the prepolymer A has a surplus of hydroxyl groups, the metal compound reacts with these groups to form a prepolymer B. In general, the reaction to form prepolymer A and prepolymer B will be adjusted so as to end up stoichiometrically balanced as to the carboxyl and hydroxyl groups. In some instances, the reaction does not have to be balanced and an excess of one reactant may be used.

In carrying out the reactions to form the prepolymers A and B, roughly the same temperature ranges will be used. In general, a temperature of from about 160° C. to 210° C. will be used with a range of 170° to 200° C. being preferred. In actual practice, a temperature will be selected i.e., 180° C. and some variation allowed i.e., ±5 or 10° C.

After forming the prepolymer B, the prepolymer B is reacted with a liquid vinyl compound in the presence of an organic peroxide. Suitable vinyl compounds are o-, m-, and p-divinyl benzene, 2,3-, 2,4-, 3,4-, 2,5- and 2,6-dichloro styrene, allyl alcohol, diallyl phthalate, methyl methacrylate and the like. Other suitable compounds would be obvious to those skilled in the art. The amount of liquid vinyl compound which is employed in the process of the present invention is from about 5% to about 100% by weight based on the weight of prepolymer B. In general, an amount of about 30–75% is convenient and utilized.

A broad spectrum of organic peroxides may be utilized to initiate the addition reaction of the present invention. Such peroxides are well known in the art and include, without limitation, caprylyl peroxide, lauroyl peroxide, 2,4-dichlorobenzoyl peroxide, methyl ethyl ketone peroxide, acetyl peroxide, cyclohexanone peroxide, benzoyl peroxide, hydroxyheptyl peroxide, cumene hydroperoxide, pinane hydroperoxide and methane hydroperoxide. Others would likewise be suitable and obvious to those skilled in the art.

In carrying out the addition polymerization any temperature from about 15° C. to about 130° C. may be employed. In general, a temperature of from about room temperature to about 85° C. will be used.

The following examples are given to illustrate the invention and are not intended to limit it in any manner. All parts are given in parts by weight unless otherwise indicated. In the examples the equivalents and acid numbers are obtained in the conventional manner.

PREPARATION OF OCTA-CARBOXYLATED METAL PHTHALOCYANINE CONDENSATION MONOMERS

An 84.0 g. sample of pyromellitic dianhydride and 0.116 g. of ammonia molybdate are melted at 150° C. in a tall form beaker. Next, 72.6 g. of urea and 11.16 g. of $Cu_2Cl_2$ are added with stirring. The temperature is raised to 200° C. and held there. After about 20 minutes, a green solid forms which is broken up and held at 200° C. for 5 hours to complete the reaction. The product is cooled, and washed on a Buchner filter with 1200 ml. hot distilled water followed by 500 ml. acetic acid. The product is finally washed with 2 liters of hot distilled water (90° C.) until neutral and it is then vacuum dried at 110° C. for 18 hours.

The octa-carboxylated copper phthalocyanine compound has a molecular weight of 928.14 and the following structure:

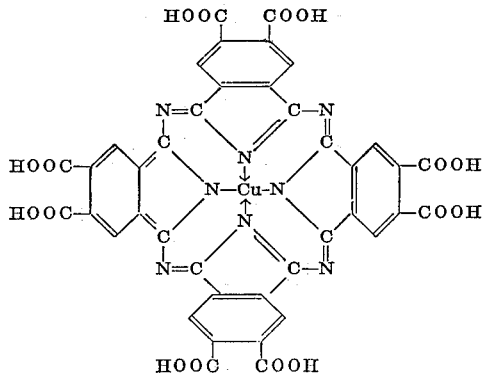

The resulting compound is a dark green powder and is obtained in a yield of about 71 grams.

When 10.7 g. of $MgCl_2$ is substituted for the 11.16 g. of $Cu_2Cl_2$ in the above procedure, the corresponding magnesium compound is obtained instead of the copper compound.

When 12.5 g. of $CaCl_2$ is substituted for the 11.16 g. of $Cu_2Cl_2$ in the above procedure, the corresponding calcium compound is obtained.

When 20 g. of $PdCl_2$ is substituted for the 11.16 g. of $Cu_2Cl_2$ in the above procedure, the corresponding palladium compound is obtained.

Example 1

A high molecular weight prepolymer A is prepared by reacting in a flask 190 grams (5.0 equivalents) of 1,2-propylene glycol with 221 grams (4.5 equivalents) of maleic anhydride at a temperature of 180±5° C. The water which is formed in the reaction is removed from the reaction flask by the use of a nitrogen gas sparge, a water cooled condenser and a vacuum pump (pressure of 50–100 mm. of Hg). The reaction is allowed to proceed for about 6 hours at which time the acid number of the prepolymer A is 38.

The flask is opened and 50 grams (0.431 equivalent) of the octa-carboxylated copper phthalocyanine is then added. The pressure is again reduced and the flask heated to 180±5° C. utilizing the same nitrogen sparge. In this example, there is an excess of 0.069 equivalent of hydroxyl groups. After about 2½ hours the acid number drops to 19.5 at which time heating is discontinued. The prepolymer B is cooled to room temperature and is found to be a very highly viscous dark green fluid. The prepolymer B contains 0.59% copper and 8.61% of the esterified octa-carboxylated copper thalocyanine.

The prepolymer B is then heated to 80° C. and 100 mg. of hydroquinone is added as a polymerization inhibitor. Liquid styrene is then added in an amount of 183 g. (about 32% by weight based on the weight of prepolymer B) while maintaining the sparging atmosphere. This gives a dark green viscous unsaturated polyester resin which is stable until a peroxide is added to the system.

To form cross-linking bonds between the unsaturated polyester prepolymer B and the styrene, 2% by weight of benzoyl peroxide is added to the dark green solution at room temperature. The unsaturated polyester resin crosslinks with the styrene to form a very hard dark green polymer in a period of 30 minutes to 120 minutes. During this time, the polymer is cast into a sheet about 10 mils in thickness. On curing a very hard brittle dark green sheet is formed whose surface is glossy and tack free.

An electrically insulated "black box" is made by lining the interior of a box with black velvet and covering the exterior with metal sheets. A brass disc 1½" in diameter is insulated from the box and suspended from the cover of the box. The disc bears against a sheet of the polymer which in turn bears against a screen held by the insulated brass holder having a 1½" hole in the center to allow light to impinge upon the sample through the screen from a light source in the bottom of the box. The light source has a constant intensity but may be turned on and off. A sheet of the polymer 10 mils in thickness is placed in position in the box. A charge of 200 volts D.C. is placed between the brass disc and the brass holder for a period of 15 seconds and then removed. The brass plate is then shortened to the brass disc for 15 seconds and removed. A conventional electrometer for measuring static charge is connected to the brass disc. A conventional XY recorder is connected to the output of the electrometer to chart the charge on the polymer sample. With the electrometer and the recorder running, the polymer sample shows a very gradual decline in static charge in the dark. When the light source is turned on the recorder shows a very rapid loss of static charge showing the sample to be highly photoconductive.

Example 2

A high molecular weight prepolymer A is prepared by reacting in a flask 225 grams (5.0 equivalents) of 1,4-butane diol with 197.3 grams (4.03 equivalents) of maleic anhydride at a temperature of 185±5° C. The water which is formed in the reaction is removed from the reaction flask by the use of a nitrogen gas sparge, a water cooled condenser and a vacuum pump (pressure of 50–100 mm. of Hg). The reaction is allowed to proceed for about 4½ hours at which time the acid number of the prepolymer A is 37.

The flask is opened and 100 grams (0.86 equivalent) of the octa-carboxylated copper phthalocyanine is then added. The pressure is again reduced and the flask heated to 185±5° C. utilizing the same nitrogen sparge. In this example, there is an excess of 0.108 equivalent of hydroxyl groups. After about 2 hours the acid number drops to 13 at which time heating is discontinued to give a prepolymer B in the flask. The prepolymer B contains 1.27% copper and 18.50% of a esterified octa-carboxylated copper phthalocyanine.

The prepolymer B is then cooled to 132° C. and 150 mg. of hydroquinone is added as a polymerization inhibitor. The product is then cooled to 80° C. Liquid styrene is then added in an amount of 79 g. (about 17% by weight based on the weight of the prepolymer B) while maintaining the sparging atmosphere. This gives a dark green viscous unsaturated polyester resin which is stable until a peroxide is added to the system.

Part of the polymer is then blended with more styrene to bring the styrene content up to 31% by weight, based on the weight of prepolymer B. The two samples are cured in the form of sheets about 10 mils in thickness by the addition of 2% by weight benzoyl peroxide at room temperature. Tough dark green polymeric sheets form. There is no evidence of tackiness in surface.

When the polymer sheet is tested as in Example 1, the polymer is shown to be photoconductive.

Example 3

A high molecular weight prepolymer B is prepared in a single stage. The polymer is prepared by reacting in a flask 127 g. (2.4 equivalents) of diethylene glycol and 108 g. (2.4 equivalents) of 1,4-butane diol with 127.5 g. (2.6 equivalents) of maleic anhydride, 102.3 g. (1.4 equivalents) of adipic acid and 92.8 g. (0.8 equivalent) of octa-carboxylated copper phthalocyanine. The components are reacted in a flask at a temperature of 185±5° C. The water which is formed in the reaction is removed by the use of a nitrogen gas sparge, a water cooled condenser and a vacuum pump (pressure of 50 mm. of Hg). The reaction is allowed to proceed for about 6 hours at which time the acid number of the prepolymer B is about 24.

The prepolymer B is then cooled to 80° C. and 350 milligrams of hydroquinone is added as a polymerization inhibitor. Liquid styrene is then added in an amount of 176 g. (about 34% by weight based on the weight of the prepolymer B) while maintaining the sparging atmosphere. This gives a dark green viscous unsaturated polyester resin which is stable until peroxide is added to the system.

To form crosslinking bonds between the unsaturated polyester prepolymer B and the styrene, 2% by weight of benzoyl peroxide is added to the dark green solution at room temperature. The unsaturated polyester resin crosslinks with the styrene to form a dark green polymer which is flexible when cast as a sheet about 10 mils in thickness. The sheet surface is glossy and tack free.

When the polymer sheet is tested, as in Example 1, the polymer is shown to be photoconductive.

Examples 4–7

When the corresponding magnesium, calcium and palladium octa-carboxylated phthalocyanine compounds are substituted into the procedure of Example 1, substantially the same results are obtained.

The polymers formed in accordance with the present invention can be cast into a thin sheet or film to form photoconductive surfaces. The sheets may be attached to the electrically conductive plate by the use of adhesives or they may be cast directly onto the surface of the plate to give intimate bonding. The resulting photoconductive plate can be used in the same applications where photoconductive materials have been used in the past. Since photoconductivity is a surface phenomena, the thickness of the cover or sheet may be varied as desired.

Many equivalent modifications and variations of the present invention will be apparent to those skilled in the art from a reading of the foregoing without a departure from the inventive concept.

What is claimed is:

1. A photoconductive sheet comprising a sheet of a polymer formed by reacting a molar equivalent of a glycol of the formula $$R(OH)_2$$

wherein R is an organic radical with from about 0.50 to about 0.95 molar equivalent of difunctional organic acid in which from about 0.1 to about 0.95 of the molar equivalent is supplied by an acid selected from the group consisting of fumaric acid, maleic acid, and maleic anhydride, at a temperature from about 160° to 210° C. to give a prepolymer A having an acid number of from about 5 to about 100, reacting the prepolymer A with from about 0.05 to about 0.50 molar equivalent of a compound of the formula

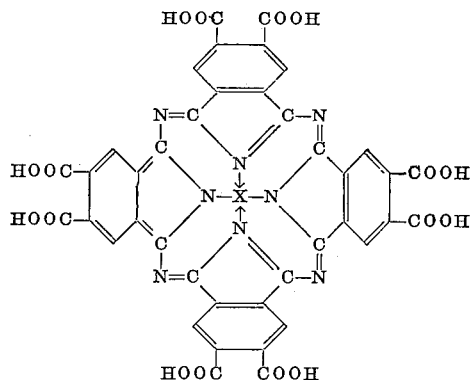

wherein X is a polyvalent metal at a temperature from about 160° to 210° C. and give a prepolymer B, cooling the resulting prepolymer B and thereafter reacting prepolymer B with from about 5% to about 100% by weight, based on the weight of prepolymer B, of a liquid vinyl compound of the formula $$CH_2=CH-Y$$

wherein Y is an organic radical having from 1 to about 15 carbon atoms in the presence of an organic peroxide.

2. A photoconductive plate comprising an electrically conductive sheet having a coating of the photoconductive organic polymer of claim 1.

3. The photoconductive plate of claim 2 wherein the photoconductive polymer is formed by reacting a molar equivalent of a glycol of the formula $$R(OH)_2$$

wherein R is an organic radical with from about 0.50 to about 0.95 molar equivalent of a difunctional organic acid in which from about 0.1 to about 0.95 of the molar equivalent is supplied by an acid selected from the group consisting of fumaric acid, maleic acid and maleic anhydrive, at a temperature from about 170° to 200° C. to give a prepolymer A having an acid number of from about 5 to about 100, reacting the prepolymer A with from about 0.05 to about 0.50 molar equivalent of a compound of the formula

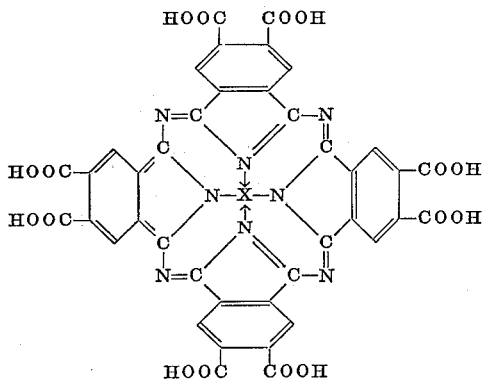

wherein X is a polyvalent metal at a temperature from 170 to 200° C. and give a prepolymer B, cooling the resulting prepolymer B and thereafter reacting prepolymer B with from about 5% to about 100% by weight, based on the weight of prepolymer B, of a liquid vinyl compound of the formula

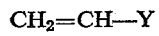

$CH_2=CH-Y$ wherein Y is an organic radical having from 1 to about 15 carbon atoms in the presence of an organic peroxide.

4. The photoconductive plate of claim 2 wherein the liquid vinyl compound is styrene.

5. The photoconductive plate of claim 2 wherein X is copper.

6. The photoconductive plate of claim 2 wherein the molar equivalent of the difunctional organic acid is supplied solely by adipic acid and maleic anhydride.

7. The photoconductive plate of claim 2 wherein the molar equivalent of the difunctional organic acid is supplied solely by maleic anhydride.

8. The photoconductive plate of claim 2 wherein the glycol is 1,4-butane diol.

9. The photoconductive plate of claim 2 wherein the glycol is 1,2-propylene glycol.

10. The photoconductive plate of claim 2 wherein the glycol is diethylene glycol.

References Cited
UNITED STATES PATENTS

| | | | |
|---|---|---|---|
| 3,037,861 | 6/1962 | Hoegl et al. | 96—1.5 |
| 3,155,503 | 11/1964 | Cassiers et al. | 96—1.5 |
| 3,397,086 | 8/1968 | Bartfai | 96—1.5 X |

GEORGE F. LESMES, Primary Examiner

C. E. VAN HORN, Assistant Examiner

U.S. Cl. X.R.

260—868